US012639590B2

(12) United States Patent
Look et al.

(10) Patent No.: US 12,639,590 B2
(45) Date of Patent: May 26, 2026

(54) COMPUTER-IMPLEMENTED METHOD FOR PREDICTING A BEHAVIOR OF AGENTS IN A DYNAMIC SYSTEM WITH A MULTIPLICITY OF INTERACTING AGENTS

(71) Applicant: Robert Bosch GmbH, Stuttgart (DE)

(72) Inventors: Andreas Look, Kleinsendelbach (DE); Barbara Rakitsch, Stuttgart (DE); Jan Peters, Seeheim-Jugenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 602 days.

(21) Appl. No.: 18/308,629

(22) Filed: Apr. 27, 2023

(65) Prior Publication Data

US 2023/0368045 A1 Nov. 16, 2023

(30) Foreign Application Priority Data

May 13, 2022 (DE) ...................... 10 2022 204 723.0

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS

2018/0124423 A1* 5/2018 Choi .......................... G06T 7/20
2022/0297728 A1* 9/2022 Varadarajan ........... G06V 10/82

OTHER PUBLICATIONS

Rudenko et al., "Human Motion Trajectory Prediction: a Survey," The International Journal of Robotics Research, vol. 39, No. 8, 2020, pp. 895-935.
Mozaffari et al., "Deep Learning-Based Vehicle Behavior Prediction for Autonomous Driving Applications: a Review," IEEE Transactions On Intelligent Transportation Systems, vol. 23, No. 1, 2022, pp. 33-47.
Look et al., "Deterministic Variational Inference for Neural Sdes," Cornell University, 2021, pp. 1-19.
(Continued)

*Primary Examiner* — G. C. Neurauter, Jr.
(74) *Attorney, Agent, or Firm* — NORTON ROSE FULBRIGHT US LLP

(57) ABSTRACT

A computer-implemented method for predicting a behavior of agents in a dynamic system with a multiplicity of interacting agents depending on the latent state thereof. For a plurality of components and for a plurality of time points up to a prediction time point, a value of a first moment of a first distribution, which models the latent state of the agents, is determined for each component. A value of a second moment of the first distribution is determined. An expected value for a first moment of a second distribution at the prediction time point is determined for each component depending on the value of the first moment of the first distribution at the prediction time point and depending on the value of the second moment of the first distribution at the prediction time point. The second distribution models the behavior of the agents depending on the latent state thereof.

15 Claims, 5 Drawing Sheets

(56) References Cited

OTHER PUBLICATIONS

Tang et al., "Multiple Futures Prediction," 33rd Conference On Neural Informationprocessing Systems (NEURIPS 2019), NeurIPS, 2019, pp. 1-11. https://proceedings.neurips.cc/paper_files/paper/2019/file/86a1fa88adb5c33bd7a68ac2f9f3f96b-Paper.pdf Downloaded Apr. 27, 2023.

Casas et al., "Implicit Latent Variable Model for Scene-Consistent Motion Forecasting," European Conference On Computer Vision (ECCV), 2020, pp. 1-18. https://www.ecva.net/papers/eccv_2020/papers_ECCV/papers/123680613.pdf Downloaded Apr. 27, 2023.

Wu et al., "Deterministic Variational Inference for Robust Bayesian Neural Networks," International Conference On Learning Representations (ICLR), 2019, pp. 1-24. https://openreview.net/pdf?id=B11080Act7 Downloaded Apr. 27, 2023.

Look et al., "Deterministic Inference of Neural Stochastic Differential Equations,"Cornell University, 2020, pp. 1-20. https://arxiv.org/pdf/2006.08973v1.pdf Downloaded Apr. 27, 2023.

Battaglia et al., "Relational Inductive Biases, Deep Learning, and Graph Networks," Cornell University, 2018, pp. 1-40. https://arxiv.org/pdf/1806.01261.pdf Downloaded Apr. 27, 2023.

* cited by examiner

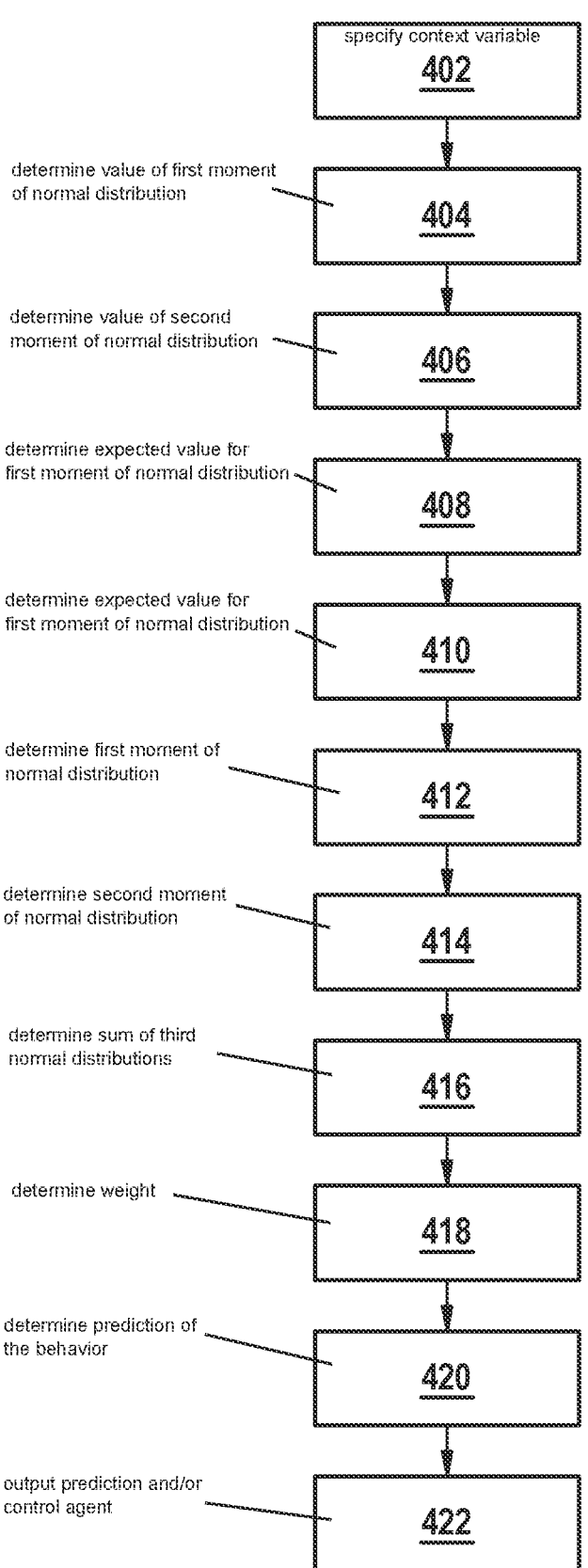

specify context variable
402 determine value of first moment
of normal distribution
404 determine value of second
moment of normal distribution
406 determine expected value for
first moment of normal distribution
408 determine expected value for
first moment of normal distribution
410 determine first moment of
normal distribution
412 determine second moment
of normal distribution
414 determine sum of third
normal distributions
416 determine weight
418 determine prediction of
the behavior
420 output prediction and/or
control agent
422

Fig. 4

COMPUTER-IMPLEMENTED METHOD FOR PREDICTING A BEHAVIOR OF AGENTS IN A DYNAMIC SYSTEM WITH A MULTIPLICITY OF INTERACTING AGENTS

CROSS REFERENCE

The present application claims the benefit under 35 U.S.C. § 119 of German Patent Application No. DE 10 2022 204 723.0 filed on May 13, 2022, which is expressly incorporated herein by reference in its entirety.

FIELD

The present invention relates to a computer-implemented method for predicting a behavior of agents in a dynamic system with a multiplicity of interacting agents.

BACKGROUND INFORMATION

Possibilities of predicting behavior in such systems are described in Charlie Tang and Russ Salakhutdinov, "Multiple Futures Prediction," 2019, NeurIPS and in Sergio Casas and Cole Gulino and Simon Suo and Katie Luo and Renjie Liao and Raquel Urtasun, "Implicit Latent Variable Model for Scene-Consistent Motion Forecasting," 2020 ECCV.

SUMMARY

By the computer-implemented method and device according to the present invention, precise prediction of a behavior of agents is achieved at low cost with regard to the required computing resources.

According to an example embodiment of the present invention, a method for predicting the behavior of agents in a dynamic system with a multiplicity of interacting agents depending on the latent state thereof provides that for a plurality of components and for a plurality of time points up to a prediction time point, a value of a first moment of a first distribution, which models the latent state of the agents, is determined for each component, wherein a value of a second moment of the first distribution is determined, wherein an expected value for a first moment of a second distribution at the prediction time point is determined for each component depending on the value of the first moment of the first distribution at the prediction time point and depending on the value of the second moment of the first distribution at the prediction time point, wherein the second distribution models the behavior of the agents depending on the latent state thereof, wherein the expected value for the first moment of the second distribution defines a first moment of a third distribution, wherein a second moment of the third distribution is determined for each component, wherein a sum, in particular a sum weighted with at least one weight, of the third distributions of the component is determined, and wherein the prediction of the behavior is determined depending on the sum.

Preferably, according to an example embodiment of the present invention, it is provided that the value of the first moment of the first distribution is determined depending on a value of the first moment of the first distribution for a time point preceding the time point and on an expected value for a deterministic change of the first moment of the first distribution, and/or that the value of the second moment of the first distribution for the time point is determined depending on a value of the second moment of the first distribution for a time point preceding the time point and on a covariance of the deterministic change and on an expected value for a stochastic change of the second moment of the first distribution. This efficiently recursively determines the respective value.

The value of the second moment of the first distribution for the time point is preferably determined depending on the value of the second moment of the first distribution for the preceding time point and on the covariance of the deterministic change and on a covariance of the latent state at the preceding time point with the deterministic change and on a transpose of the covariance of the latent state at the preceding time point with the deterministic change and on the expected value for the stochastic change. This efficiently recursively determines the value.

Preferably, according to an example embodiment of the present invention, the expected value for the first moment of the second distribution is determined depending on the value of the first moment of the first distribution at the prediction time point. This efficiently determines the expected value.

Preferably, according to an example embodiment of the present invention, a covariance of the first moment of the second distribution is determined for each component depending on the value of the first moment of the second distribution at the prediction time point, wherein an expected value for the second moment of the second distribution at the prediction time point is determined for each component depending on a latent state at the prediction time point, wherein the second moment of the third distribution is determined for each component depending on the covariance of the first moment of the second distribution and on the expected value for the second moment of the second distribution at the prediction time point. The method can thus be performed particularly efficiently.

Preferably, according to an example embodiment of the present invention, a context variable is determined, which comprises an association, which associates at least one agent with another agent to be considered for predicting the behavior of this agent, and/or which characterizes a history of the dynamic system, wherein the first moment of the first distribution is determined depending on the context variable, and/or wherein the second moment of the first distribution is determined depending on the context variable, and/or wherein the expected value for the first moment is determined depending on the context variable, and/or wherein the first moment of the third distribution is determined depending on the context variable, and/or wherein the second moment of the third distribution is determined depending on the context variable, and/or wherein the at least one weight is determined for at least one component depending on the context variable. A neighborhood and/or a history of the agents is thereby considered.

According to an example embodiment of the present invention, the history is preferably determined depending on an observed behavior of the at least one agent, in particular a behavior which comprises the agent's position or movement, wherein the agent's position or movement is in particular acquired using a receiver for a satellite-based position determination system, or wherein at least one digital image is acquired, in particular using a sensor for digital images, preferably a camera, a LiDAR sensor, ultrasonic sensor, movement sensor, thermal imaging detector, and/or radar sensor, and the agent's position or movement is determined depending on at least one digital image, or wherein a signal is acquired using a speaker for receiving audible sound and the agent's position or movement is determined depending on the signal.

It may be provided that the context variable comprises a matrix, whose rows each represent one of the agents and whose columns each represent one of the agents, wherein at least one value, in particular a binary value, of an element of the matrix identified by a row and a column is determined and specifies whether or not the agent identified by the row is to be considered for the prediction for the agent identified by the column, or wherein at least one value, in particular a binary value, of an element of the matrix identified by a row and a column is determined and specifies whether or not the agent identified by the column is to be considered for the prediction for the agent identified by the row. The matrix represents a neighborhood to be considered. As a result, the calculation considers the most relevant agents in particular. As a result, the best possible prediction is calculated particularly efficiently.

Preferably, according to an example embodiment of the present invention, the first moment and the second moment of the first distribution are determined in iterations, wherein for a first one of the iterations for each component, a value of the first moment of the first distribution and a value of the second moment of the first distribution are determined, which depends on the context variable. The history is thereby considered particularly efficiently.

Preferably, according to an example embodiment of the present invention, it is provided that, for the prediction, latent states of an agent are modeled independently of one another and latent states of different agents are modeled independently of one another, or latent states of an agent are modeled independently of one another and corresponding elements of latent states of different agents are modeled dependently on one another, or different elements of a latent state of an agent are modeled dependently on one another and latent states of different agents are modeled independently of one another. This makes the calculation very efficient.

Preferably, according to an example embodiment of the present invention, at least one agent, in particular a computer-controlled machine, in particular a robot, preferably a vehicle, a household appliance, a driven machine, a manufacturing machine, a personal assistant, or an access control system is controlled depending on the prediction. This control is particularly robust.

The at least one agent may be an existing real object in the physical world.

According to an example embodiment of the present invention, the device comprises at least one processor and at least one memory, which are designed to perform the method. This device has advantages corresponding to those of the method.

According to an example embodiment of the present invention, a system comprises at least one agent, in particular a computer-controlled machine, in particular a robot, preferably a vehicle, a household appliance, a driven machine, a manufacturing machine, a personal assistant, or an access control system, wherein the agent or the system comprises the device, and wherein the device is designed to control the agent depending on the prediction. This system has advantages corresponding to those of the method.

According to an example embodiment of the present invention, a computer program comprises computer-readable instructions that, when executed by a computer, cause the method to run. This computer program has advantages corresponding to those of the method.

Further advantageous embodiments can be taken from the following description and the figures.

BRIEF DESCRIPTION OF THE DRAWINGS

FIG. 4 shows steps in a method for predicting, according to an example embodiment of the present invention.

DETAILED DESCRIPTION OF EXAMPLE EMBODIMENTS

Figure 1:
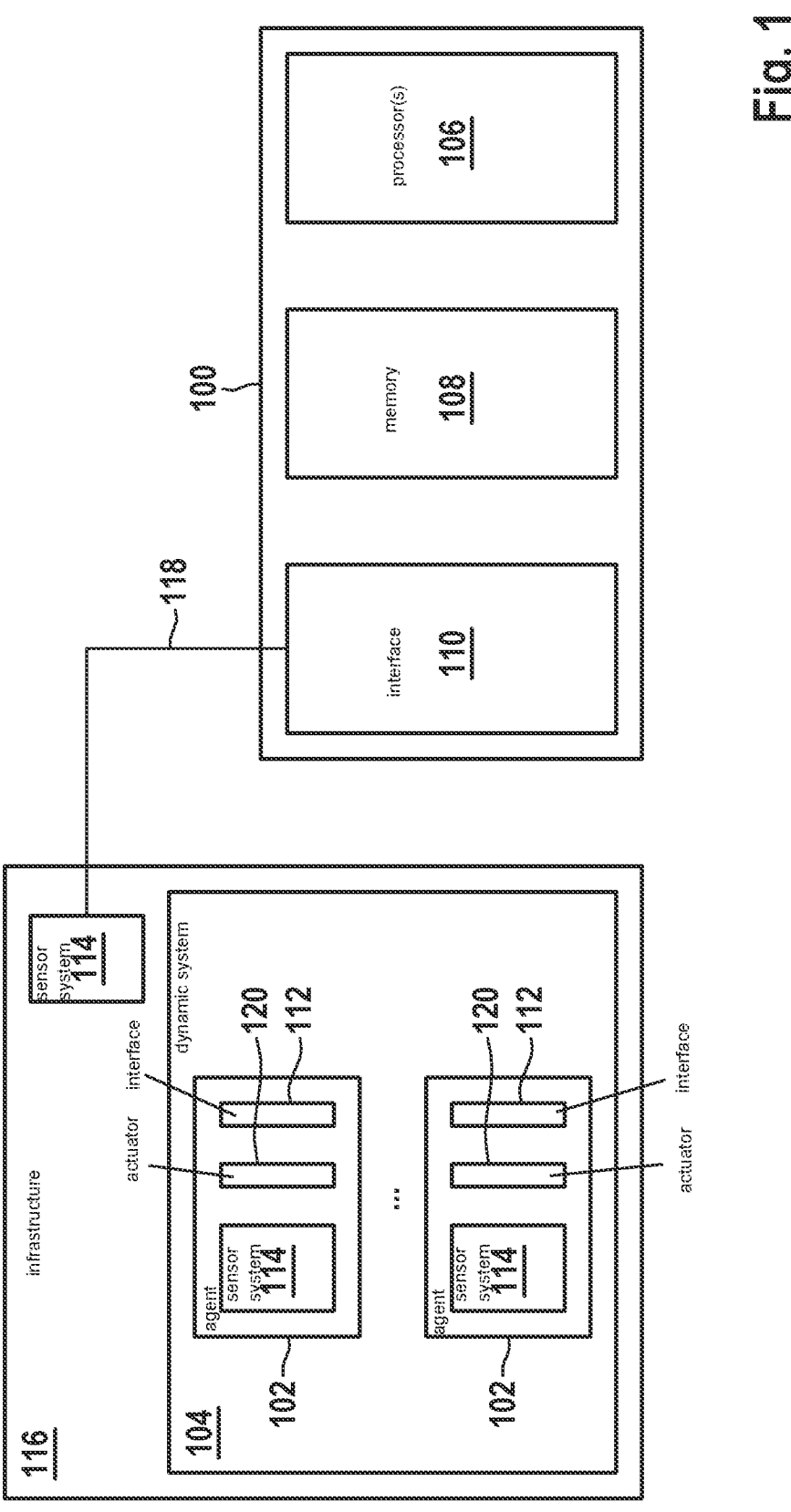
FIG. 1 shows a schematic representation of a device for predicting a behavior of agents in a dynamic system with a multiplicity of interacting agents, according to an example embodiment of the present invention.

FIG. 1 schematically shows a device 100 for predicting a behavior of agents 102 in a dynamic system 104 with a multiplicity of interacting agents 102. The dynamic system 104 in the example is a physical system, in particular a technical system. The agents 102 may be physical systems, in particular technical systems. The agents 102 may be an existing real objects in the physical world. The device 100 comprises at least one processor 106 and at least one memory 108. The device 100 is designed to perform a below described method for predicting the behavior of the agents 102 in the dynamic system 104. The device 100 optionally comprises an interface 110. The agents 102 optionally comprise an interface 112. The device 100 and the agents 102 are optionally designed to communicate via their interfaces, for example in order to transmit information about a behavior of the agents 102 from the agents 102 to the device 100 or to send information about a prediction of the behavior from the device 100 to the agents 102. A sensor system 114 may be provided that is designed to acquire information about the behavior of the agents 102 in the dynamic system 104. The sensor system 114 may be designed to measure a physical property of the agents 102. The agents 102 are optionally designed to provide information about their own behavior or about the behavior of other agents 102. For example, the information about their own behavior is acquired using the sensor system 114. For example, the sensor system 114 is arranged in one or more of the agents 102 and designed to acquire the information about the own behavior of the respective agent 102 and/or the behavior of the other agents 102. The sensor system 114 is, for example, designed to acquire a position or movement of the agents 102. The sensor system 114 may comprise a receiver for a satellite-based position determination system, e.g., a global positioning system, or a sensor for digital images, such as a camera, a LiDAR sensor, ultrasonic sensor, movement sensor, thermal imaging detector, and/or radar sensor. The sensor system 114 is, for example, designed to acquire a position or movement of the agents 102. The sensor system 114 may comprise a speaker for receiving audible sound and for generating audio signals. It may be provided that the sensor system 114 is arranged in an infrastructure 116 and is at least intermittently connected via a communication link 118 to the interface 110 of the device 100 in which the agents 102 can move. Instead of the sensor system 114, it may be provided that the data comprises information about the agents 102, in particular data structured in a graph.

The agents 102 are optionally designed to determine their own behavior depending on the prediction of the behavior of the other agents 102. For example, the agents 102 each comprise an actuator 120 that is designed to influence the behavior of the respective agent 102 depending on the prediction. It may also be provided that the device 100 is designed, instead of transmitting the prediction to the agents 102, to determine a control command for at least one agent 102 depending on the prediction and to transmit the control command to the agent(s) 102 to be controlled. In this case, the actuator 120 is designed to execute the control command. It may be provided that the device 100 is integrated in one or more of the agents 102.

Likewise provided is a computer program that contains instructions that, when executed by a computer, cause this method to run. For example, the at least one processor 102 executes the computer program.

Figure 2:
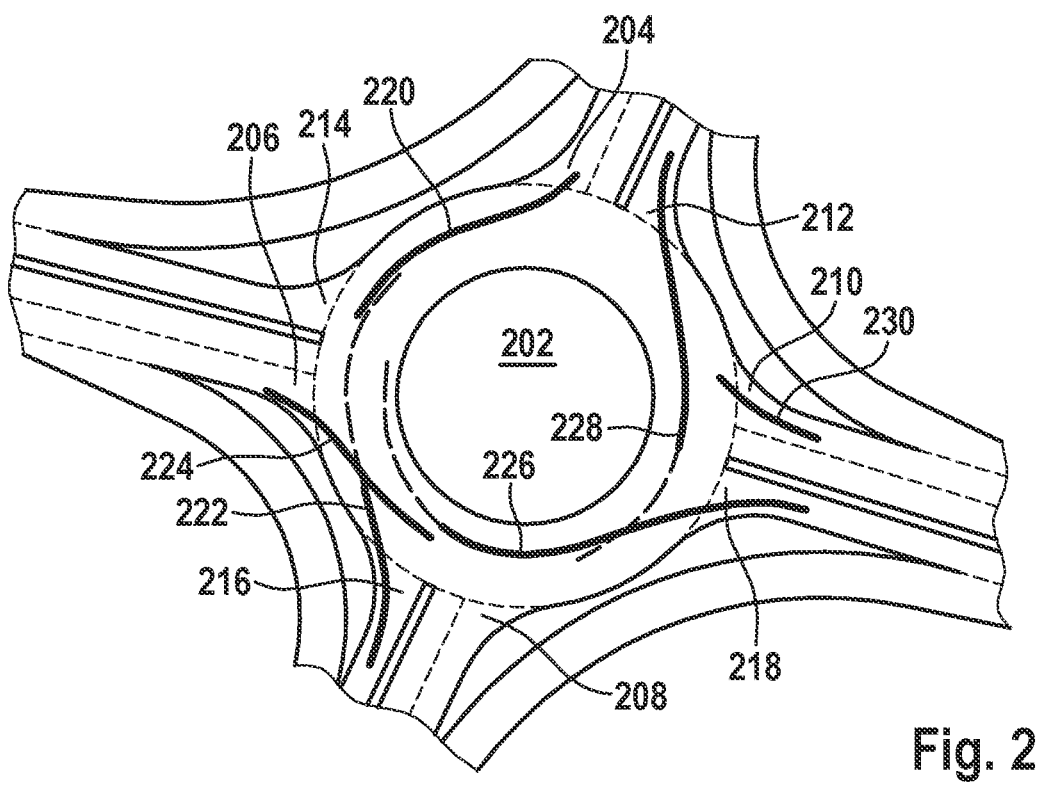
FIG. 2 shows a behavior of agents in an exemplary dynamic system, according to an example embodiment of the present invention.

FIG. 2 shows a behavior of agents 102 in an exemplary system 104. In the example, the behavior of the agents 102 is observed, wherein FIG. 2 shows trajectories on which the agents 102 have actually moved according to an observation of their behavior from a start time point of the observation to an end time point of the observation.

For example, the dynamic system 104 is a technical system in which the agents 102 are computer-controlled machines, e.g., robots, such as vehicles, household appliances, driven machines, manufacturing machines, personal assistants, or access control systems.

The dynamic system 104 may also be another system. For example, the dynamic system 104 is a molecular dynamics in which the agents 102 are atoms or molecules whose movements are being predicted. For example, the dynamic system is a game, such as a soccer, basketball, or American football game, in which the agents are people or game equipment, e.g., a ball, whose movements are being predicted.

The dynamic system 104 in the example is a roundabout 202. In the example, the roundabout 202 has a first entry 204, a second entry 206, a third entry 208, and a fourth entry 210. In the example, the roundabout 202 has a first exit 212, a second exit 214, a third exit 216, and a fourth exit 218. The agents 102 in the example include vehicles. It may be provided that the agents 102 include pedestrians. From the start time point, a first vehicle moves on a first observed trajectory 220 from the first entry 204 in the roundabout 202 and, at the end time point, is located in the roundabout 202 in the area of the second exit 214. From the start time point, a second vehicle moves on a second observed trajectory 222 from the area of the second exit 214 in the roundabout 202, exits the roundabout 202 via the third exit 216 and, at the end time point, is located outside the roundabout 202. From the start time point, a third vehicle moves on a third observed trajectory 224 from the second entry 206 in the roundabout 202 and, at the end time point, is located in the roundabout 202 in the area of the third exit 216. From the start time point, a fourth vehicle moves on a fourth observed trajectory 226 from an area in the roundabout 202 between the second exit 214 and the second entry 206 in the roundabout 202 and, at the end time point, is located in the fourth exit 218. From the start time point, a fifth vehicle moves on a fifth observed trajectory 228 from an area in the roundabout 202 between the third exit 208 and the fourth entry 218 in the roundabout 202 and, at the end time point, is located in the first exit 212. From the start time point, a sixth vehicle moves on a sixth observed trajectory 230 in the area of the fourth entry 210 until the end time point.

Figure 3:
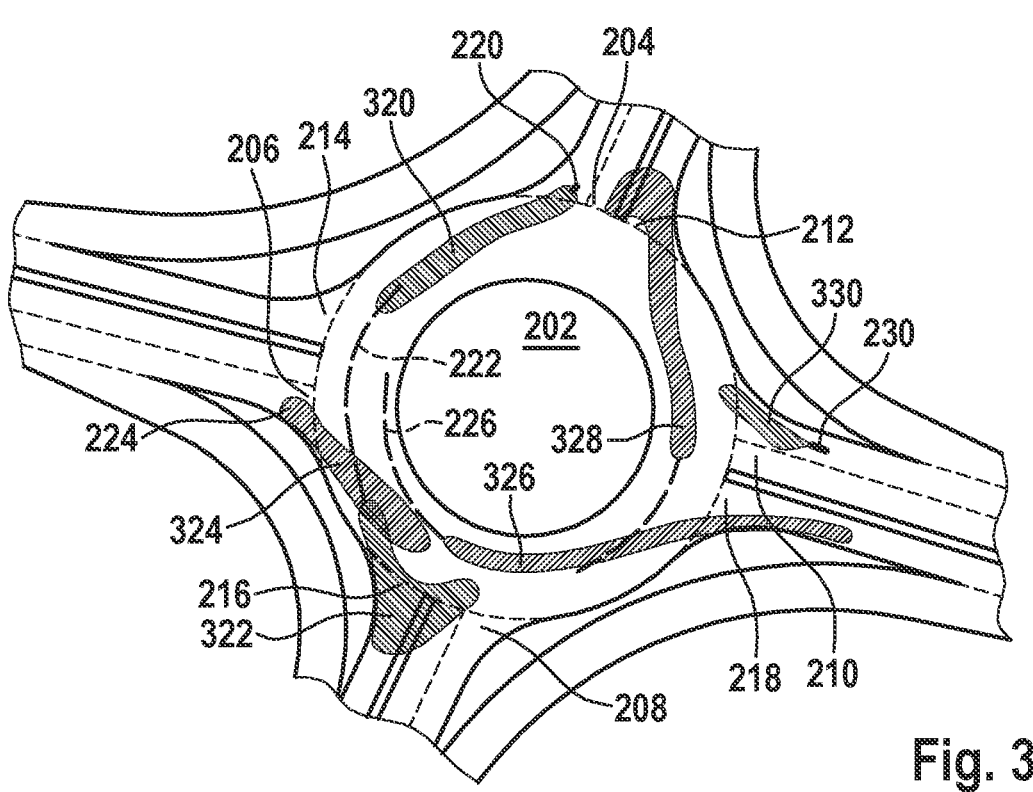
FIG. 3 shows a prediction of the behavior of the agents in the dynamic system, according to an example embodiment of the present invention.

FIG. 3 shows a prediction of the behavior of the agents 102 in the dynamic system 104 using the example of the roundabout 202.

From the start time point, the first vehicle moves on the first observed trajectory 220 until an observation end time point. In the example, the first vehicle does not move but is located in the first entry 204 until the observation end time point. A first predicted trajectory 320 between the observation end time point and a prediction end time point is determined for the first vehicle. According to the prediction, the first vehicle moves from the first entry 204 in the roundabout 202 and, at the end time point, is located in the roundabout 202 in the area of the second exit 214.

From the start time point until the observation end time point, the second vehicle moves on the second observed trajectory 222 to an area in the roundabout 202 between the second entry 206 and the third exit 216. This portion of the second observed trajectory 222 is shown with dashed lines in FIG. 2 and in FIG. 3. A second predicted trajectory 322 between the observation end time point and the prediction end time point is determined for the second vehicle. According to the prediction, the second vehicle moves from the area in the roundabout 202 between the second entry 206 and the third exit 216 in the roundabout 202, exits the roundabout 202 via the third exit 216 and, at the end time point, is located outside the roundabout 202.

From the start time point until the observation end time point, the third vehicle moves on the third observed trajectory 224. In the example, the third vehicle does not move but is located in the second entry 206 until the observation end time point. A third predicted trajectory 324 between the observation end time point and the prediction end time point is determined for the third vehicle. According to the prediction, the third vehicle moves from the second entry 206 in the roundabout 202 and, at the end time point, is located in the roundabout 202 in the area of the third exit 216.

From the start time point until the observation end time point, the fourth vehicle moves on the fourth observed trajectory 226 to an area in the roundabout 202 between the third exit 216 and the third entry 208. This portion of the fourth observed trajectory 226 is shown with dashed lines in FIG. 2 and in FIG. 3. A fourth predicted trajectory 326 between the observation end time point and the prediction end time point is determined for the fourth vehicle. According to the prediction, the fourth vehicle moves from an area in the roundabout 202 between the third exit 216 and the third entry 208 in the roundabout 202 and, at the end time point, is located in the fourth exit 218.

From the start time point until the observation end time point, the fifth vehicle moves on the fifth observed trajectory 228 to an area in the roundabout 202 between the fourth exit 218 and the fourth entry 210. This portion of the fifth observed trajectory 228 is shown with dashed lines in FIG. 2 and in FIG. 3. A fifth predicted trajectory 328 between the observation end time point and the prediction end time point is determined for the fifth vehicle. According to the prediction, the fifth vehicle moves from an area in the roundabout 202 between the fourth exit 218 and the fourth entry 210 in the roundabout 202 and, at the end time point, is located in the first exit 212.

From the start time point until the observation end time point, the sixth vehicle moves on the sixth observed trajectory 230. In the example, the sixth vehicle does not move but is located in the fourth entry 210 until the observation end time point. A sixth predicted trajectory 330 between the observation end time point and the prediction end time point is determined for the sixth vehicle. According to the prediction, the sixth vehicle moves in the area of the fourth entry 210 until the end time point.

The predictions, i.e., the predicted trajectories in the example, are approximated as a Gaussian mixture distribution. The moments of the Gaussian mixture distribution are determined using the method described below depending on a portion of the behavior respectively observed for the individual agents 102, i.e., in the example, the observed portion, shown in dashed lines, of the respective observed trajectory.

In the example, 95% confidence intervals are visualized for the prediction with respect to the other portion shown of the observed trajectories.

The prediction of the trajectories, i.e., a time profile of positions of the agents 102, is an example. It may also be provided to determine the prediction for a distance between the agents 102, a velocity or an acceleration of the agents 102.

The behavior of the agents 102, in the example that of the vehicles, is observed for a specified time period. The prediction is determined depending on the behavior observed in the specified time period. In one example, at least one of the vehicles is an autonomous vehicle. The prediction represents a simulation of an environment of the at least one autonomous vehicle, wherein the at least one autonomous vehicle is controlled depending on the prediction.

The prediction is determined in the example by means of machine learning of a model, wherein the prediction is determined using the model.

This is described below for a latent variable $$X = \{x_t\}_{t=0}^{T}$$

with $x_t \in R^{MD_x}$ and an observed variable $$Y = \{y_t\}_{t=0}^{T}$$

of dimension $D_y$, wherein $x_t \in R^{D_x}$ is a set of M agents 102, and $$x_t^m \in R^{MD_x}$$

is a latent state of an agent m at a time point t, and $y_t^m \in R^{MD_y}$ is a state of the agents 102 at the time point t, which is defined by $$x_0 \sim p(x_0 \mid I)$$

$$x_t = x_{t-1} + f(x_{t-1}, I) + L(x_{t-1}, I)w_{t-1}, t = 1, \ldots, T$$

$$y_t \sim N\big(y_t \mid g(x_t), QQ^T(x_t)\big)$$

wherein
  $x_t$ is a latent state of the agents 102,
  $x_0$ is an initial value for the latent state of the agents 102 at the start time point t=0, $f(x_t, I): R^{MD_x} \times R^{D_I} \to R^{D_x}$ is a deterministic change in the latent state $x_t$ of the agents 102, which change is modeled in the example as a neural network parameterized with parameters $\theta_f$, $L(x_t, I): R^{MD_x} \times R^{D_I} \to R^{D_x \times D_x}$ is a stochastic change in the latent state $x_t$ of the agents 102, which change is modeled in the example as a neural network parameterized with parameters $\theta_L$, wherein $\theta = \{\theta_f, \theta_L\}$ denotes these parameters, $I \in R^{D_I}$ is a context variable that comprises an association N which associates each agent 102 with other agents 102 to be considered for predicting the behavior of this agent 102, and that comprises a history that characterizes the behavior for each agent 102, $w_t \in R^{MD_x}$ is a random variable from a normal distribution $w_t \sim N(0, I)$ through which a disturbance variable is introduced, $N(y_t \mid g(x_t), QQ^T(x_t))$ is a normal distribution whose mean value $g(x_t): R^{MD_x} \to R^{MD_y \times MD_y}$ is modeled by a non-linear neural network parameterized with parameters $\psi_g$, wherein the covariance thereof $QQ^T(x_t): R^{MD_x} \to R^{MD_y \times MD_y}$ is determined by a variable Q, which is assumed to be constant or is modeled by a non-linear neural network parameterized with parameters $\psi_Q$, wherein $\psi = \{\psi_g, \psi_Q\}$ denotes these parameters.

The variable $$Y = \{y_t\}_{t=0}^{T}$$

comprises the states of the dynamic system 104, in particular the states $y_t$ of the agents 102 at the time points t. In the example, the agents 102 are the vehicles and the variable Y comprises the observed portions of the trajectories. The variable $$X = \{x_t\}_{t=0}^{T}$$

comprises the latent states of the dynamic system 104. In the example, the variable X comprises the latent states $x_t$ of the agents 102 at the time points t. The latent states $x_t$ comprise further information for a reliable prediction of a respective future state $y_{t+1}$ of the agents 102. The latent state $x_t$ at the time point t comprises, for example, the accelerations or velocities of the vehicles at the time point t.

The prediction is determined below for a number M of agents 102 denoted hereinafter by m.

For them, the deterministic change is $$f(x_t, I) = \begin{bmatrix} \overline{f}(x_t^1, x_t^{N_1}, I) \\ \vdots \\ \overline{f}(x_t^M, x_t^{N_M}, I) \end{bmatrix}$$

and the stochastic change is $$L(x_t, I) = \text{diag} \begin{bmatrix} \overline{L}(x_t^1, x_t^{N_1}, I) \\ \vdots \\ \overline{L}(x_t^M, x_t^{N_M}, I) \end{bmatrix}$$

wherein $$\bar{f}(x_t^m, x_t^{N_m}, I) : R^{D_x} \times R^{D_x} \times R^{D_I} \to R^{D_x}$$

denotes an update to the deterministic change, wherein $$\bar{L}(x_t^m, x_t^{N_m}, I) : R^{D_x} \times R^{D_x} \times R^{D_I} \to R^{D_x}$$

denotes an update to the stochastic change, wherein $$x_t^{N_m} \in R^{D_x}$$

is a message for the agent m at the time point t, which message is determined as $$x_t^{N_m} = AGG(x_t, \varepsilon)^m$$

wherein $$N_m = \{e^{m,m'} \mid e^{m,m'} = 1\}_{m'=1}^M$$

denotes the first information item N for the agent m and an operation $AGG(x_t,\varepsilon):R^{MD_x} \times R^{M \times M} \to R^{MD_x}$ has an output m for each agent, wherein the m-th agent is associated with the m-th output, wherein $\varepsilon \in R^{M \times M}$ denotes edges of a graph that define a relationship of the agents to one another. In the example, the relationship of the agents to one another is a binary value.

After t prediction steps, this model considers correlations between agents 102 that have a distance from one another of at most t steps. In one example, distance means how many edges have to be followed to get from an agent m to an agent m'. The distance may be infinite if an agent is not connected to any other agent.

The prediction for a prediction time point T is a marginal probability $p(y_T|I)$, which as a nested integral $$p(y_T \mid I) = \int p(y_T \mid x_T) p(x_T \mid x_0, I) p(x_0 \mid I) dx_T, x_0$$

with a probability $p(y_T|x_T)$ a kernel $p(x_T|x_0,I)$ and a Gaussian mixture model (GMM) $p(x_0|I)$.

The kernel $p(x_T|x_0,I)$ is approximated for each time step t by a normal distribution $N(x_t|\mu_t(I),\Sigma_t(I))$ with a mean value $\mu_t(I)$ and a covariance $\Sigma_t(I)$, wherein $$\mu_t(I) = \mu_{t-1}(I) + E[f(x_{t-1}, I)]$$

$$\Sigma_t(I) = \Sigma_{t-1}(I) + Cov[f(x_{t-1}, I)] +$$
$$Cov[x_{t-1}, f(x_{t-1}, I)] + Cov[x_{t-1}, f(x_{t-1}, I)]^T +$$
$$E[LL^T(x_{t-1}, I)]$$

wherein E denotes the expected value, and Cov denotes the covariance, and wherein $Cov[x_{t-1},f(x_{t-1},I)]$ denotes the cross-covariance between random vectors in the arguments $x_{t-1}$ and $f(x_{t-1}, I)$.

The function $f(x,I)$ is implemented in the example as a neural network. The function $L(x,I)$ is implemented in the example as a neural network. The function $g(x)$ is implemented in the example as a neural network. The function $Q(x)$ is implemented in the example as a neural network.

An expected value and a covariance for an output of the respective neural network is determined as described, for example, in Anqi Wu, Sebastian Nowozin, Edward Meeds, Richard E. Turner, Jose Miguel Hernandez-Lobato, and Alexander L. Gaunt: "Deterministic Variational Inference for Robust Bayesian Neural Networks," in ICLR, 2019a (Anqi Wu).

The cross-covariance $Cov[x_t, f(x_t, I)]$ is approximated, for example, by $$Cov[x_t, f(x_t, I)] = Cov[x_t] E[\nabla_{x_t} f(x_t, I)]$$

wherein the expected value for the Jacobi matrix is approximated as in Andreas Look, Jan Peters, and Melih Kandemir: "Deterministic Inference of Neural Stochastic Differential Equations," arXiv, abs/2006.08973, 2020, (Andreas Look).

$$E[\nabla_{x_t} f(x_t, I)] \approx \prod_{l=1}^L E[J_t^l]$$

wherein $$J_T^l$$

is the Jacobi matrix in the layer l of the neural network at the time point t.

FIG. 4 shows steps in a method for the prediction $p(y_T|I)$ of a behavior $$y_t = \{y_t^m\}_{i=1}^M$$

of agents m in the dynamic system 104 with a multiplicity M of interacting agents m.

The prediction $p(y_T|I)$ is determined depending on the latent state $x_t$ of the agents m. The method comprises two loops, an inner loop and an outer loop.

For a first one of the iterations, the initial latent state $x_0$ it taken from a Gaussian mixture model with V components v, which is defined by the normal distribution $N(x_0|\mu_0(I),\Sigma_0(I))$.

The first moment $\mu_t$ and the second moment $\Sigma_t$ of the normal distribution $N(x_t|\mu_t(I),\Sigma_t(I))$ is determined in the inner loop in iterations. Initially, for each component v, a value of the first moment $\mu_{0,v}$ and a value of the second moment $\Sigma_{0,v}$ of the normal distribution $N(x_{0,v}|\mu_{0,v}(I)), \Sigma_{0,v}(I))$. In the example, these values depend on the context variable I.

Figure 5A:
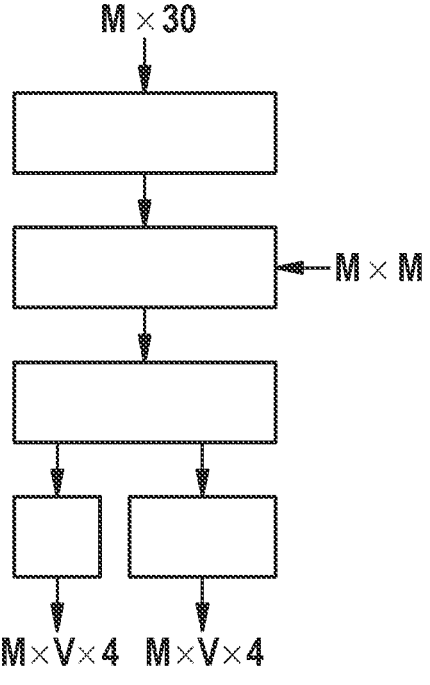
FIGS. 5A-5D show examples of neural networks, according to an example embodiment of the present invention.

The values of the moments $\mu_{0,v}$ and $\Sigma_{0,v}$ are determined as a function of the context variable I by a further neural network. An example of this neural network with 30 fully connected layers and a tanh activation, which is followed by a layer for the operation AGG, which is followed by 64 fully connected layers and a tanh activation, which is followed by a fully connected layer for the values of the first moment $\mu_{0,v}$ and which is followed by a further fully connected layer with exp activation, which is shown in FIG. 5a.

The inner loop is calculated for a plurality V of components v and for a plurality of time points t at a prediction time point T. The inner loop is calculated for the prediction time point T for the plurality V of components v.

The normal distribution $N(x_t|\mu_t(I),\Sigma_t(I))$ models the latent state $x_t$ of the agents m. The normal distribution $N(y_t|g(x_t), QQ^T(x_t))$ models the behavior $y_t$ of the agents m depending on the latent state thereof $x_t$.

In the method, a normal distribution $N(a_{T,v}(I), B_{T,v}(I))$ models a behavior of individual components v.

In a step 402, the context variable I is specified. The context variable I comprises, in one example, the association $N^m$, which associates at least one agent m with another agent m to be considered for predicting the behavior of this agent m. The context variable I in the example is given.

The association $N^m$ in one example is a matrix whose rows each represent one of the agents m and whose columns each represent one of the agents m.

In the example, a value, in particular a binary value, is determined for each element of the matrix.

In one example, the value of an element identified by its row and its column in the matrix specifies whether or not the agent m identified by the row is to be considered for the prediction for the agent m identified by the column.

In one example, the value of an element identified by its row and its column in the matrix specifies whether or not the agent m identified by the column is to be considered for the prediction for the agent m identified by the row.

For example, the relationships of the agents m to one another are modeled using the graph, wherein the values ε of the edges are determined such that, in the graph, agents m' neighboring an agent m are considered for the prediction thereof.

The context variable I comprises, in one example, the history of the dynamic system 104.

The context variable I in the example is used to determine the moments, expected values and weights, the argument of which comprises the context variable I.

The plurality V of components v is determined in the example with a neural network whose input variables comprise the history of the dynamic system 104 and the edges E from the context variable I. In one example, the history of the system 104 is defined by the observed behavior of agents m, in particular the observed portion of the trajectories.

The edges in the example in the matrix $N^m$ are binary values 0 or 1, which, for example, indicate with the value 1 that an edge exists between two nodes and are otherwise zero. The latent state $x_t^m$ of an agent m at the time point t is represented by a node in the graph.

The trajectories are defined in one example by a temporal sequence of two-dimensional or three-dimensional geographic coordinates, which indicate a temporal sequence of positions of the vehicles.

Using the operation AGG in the example, the messages $$x_t^{N_m}$$

are determined depending on the matrix $N^m$ and the one-dimensional input variable. The messages $$x_t^{N_m}$$

are concatenated the one-dimensional input variable and mapped using the neural network onto the values of the first moment $\mu_{0,v}$ and the value of the second moment $\Sigma_{0,v}$.

For example, the neural network is a graph neural network. The latter is designed, for example, as described in Peter W. Battaglia, Jessica B. Hamrick, Victor Bapst, Alvaro Sanchez-Gonzalez, Vinicius Flores Zambaldi, Mateusz Malinowski, Andrea Tacchetti, David Raposo, Adam Santoro, Ryan Faulkner, Qaglar GiAlcehre, H. Francis Song, Andrew J. Ballard, Justin Gilmer, George E. Dahl, Ashish Vaswani, Kelsey R. Allen, Charles Nash, Victoria Langston, Chris Dyer, Nicolas Heess, Daan Wierstra, Pushmeet Kohli, MatthewBotvinick, Oriol Vinyals, Yujia Li, and Razvan Pascanu; "Relational inductive biases, deep learning, and graph networks;" arXiv, abs/1806.01261, 2018.

In a step 404, for the plurality V of components v and for the plurality of time points t=1, . . . T, in iterations, until the prediction time point T, for each component v, a value of the first moment $\mu_t$ of the normal distribution $N(x_t|\mu_t(I),\Sigma_t(I))$ is determined.

The value of the first moment $\mu_t$ is determined recursively in the example. This means that the value of the first moment $\mu_t$ at a time point t is determined depending on a value of the first moment $\mu_{t-1}$ for a time point, e.g., t-1, preceding the time point t.

The following description is based on a tool which can be used to determine an expected value E[f(x)] of a function f(x), a covariance matrix Cov(f(x)) of the function f(x) and a cross-covariance matrix Cov(x,f(x)). For example, the expected value E[f(x)] and the covariance matrix Cov(f(x)) are determined, for example, as described in Anqi Wu. The cross-covariance matrix Cov(x,f(x)) is determined, for example, as described in Andreas Look.

The tool requires that layers, the moments of which can be calculated at the output, are used in the neural network to determine the expected value E[f(x)], the covariance matrix Cov(f(x)) and the cross-covariance matrix Cov(x,f(x)). The operation $AGG(x_t,\varepsilon)$ is used for this purpose.

The operation $AGG(x_t,\varepsilon)$ is implemented, for example, as a mean value aggregation in the respective neural network, wherein, for a layer l of the neural network, the message $$x_t^{l,N_m}$$

in the time step t for the agent m $$x_t^{l,N_m} = \frac{1}{|N_m|} \sum_{m' \in N_m} x_t^{l,m'}$$

is determined.

For example, for a set of messages $$x_t^{l,N},$$

the Kronecker product is used to determine, $\otimes$ depending on the $E[x_t^l]$ for the message from a layer l, the expected value $$E\left[x_t^{l,N}\right] = \left(A \otimes I_{D_{x,l}}\right)E\left[x_t^l\right]$$

and the covariance $$\mathrm{Cov}\left[x_t^{l,N}\right] = \left(A \otimes I_{D_{x,l}}\right)\mathrm{Cov}\left[x_t^l\right]\left(A \otimes I_{D_{x,l}}\right)^T$$

wherein $A \in R^{M \times M}$ is an adjacency matrix with normalized rows that comprise the information $\varepsilon$ regarding the edges in matrix form, and $I_{D_{x,l}}$ is an identity matrix of dimension $D_{x,l} \times D_{x,l}$. The Jacobi matrix is available as $$J_t^l = A \otimes I_{D_{x,l}}.$$

The tool requires that for the layers 1 of the neural network, the same affine transformation with the same weight matrix $W^l$ and the same bias $b^l$ is carried out. In one example, the calculation takes place for all layers together using a Kronecker product.

$$E\left[x_t^{l+1}\right] = \hat{W}^l E\left[x_t^l\right] + \hat{b}^l$$

$$\mathrm{Cov}\left[x_t^{l+1}\right] = \hat{W}^l \mathrm{Cov}\left[x_t^l\right](\hat{W}^l)^T + \hat{b}^l$$

with $$x_t^l = \begin{bmatrix} x_t^{l,1} \\ x_t^{l,2} \\ \vdots \\ x_t^{l,M} \end{bmatrix}$$

$$\hat{W}^l = \begin{bmatrix} W^l & 0 & \cdots & 0 \\ 0 & W^l & \cdots & 0 \\ \vdots & \ddots & & \vdots \\ 0 & 0 & \cdots & W^l \end{bmatrix}$$

$$\hat{b}^l = \begin{bmatrix} b^l \\ b^l \\ \vdots \\ b^l \end{bmatrix}$$

wherein the Jacobi matrix is available as $$J_t^l = \hat{W}^l.$$

The value of the first moment $\mu_t$ is determined in the example depending on the expected value $E[f(x_{t-1},I)]$ for the deterministic change $f(x_{t-1},I)$ of the first moment $\mu_t$.

In one example, the value of the first moment $\mu_t$ is determined as follows:

$$\mu_t(I) = \mu_{t-1}(I) + E[f(x_{t-1}, I)]$$

The expected value $E[f(x_{t-1},I)]$, i.e., the change in the first moment $\mu_t$, in one example, is comprised depending on the edges E from the context variable I and the distribution of the latent state $x_{t-1}$ at the preceding time point, is determined as described in Anqi Wu by means of the tool.

The edges in the example in the matrix $N^m$ are binary values 0 or 1, which, for example, indicate with the value 1 that an edge exists between two nodes and are otherwise zero. The latent state $$x_t^m$$

of an agent m at the time point t is represented by a node in the graph.

Using the operation AGG in the example, the messages $$x_t^{N_m}$$

are determined depending on the matrix $N^m$ and the latent state $x_{t-1}$ at the preceding time point. The messages $$x_t^{N_m}$$

are concatenated with the state $x_{t-1}$ at the preceding time point. The tool is used to determine the expected value $E[f(x_{t-1}, I)]$.

Figure 5B:
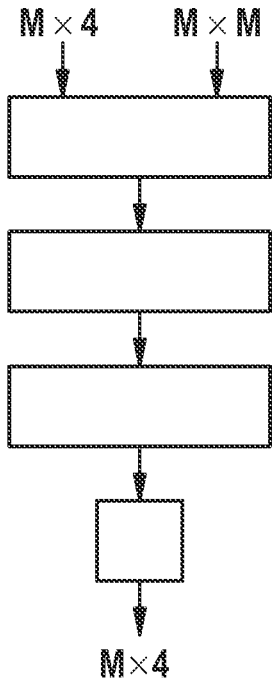

An example of a neural network $f(x_{t-1}, I)$ with a layer for the operation AGG, which is followed by 24 fully connected layers and a ReLu activation, which is followed by a fully connected layer and a ReLu activation, which is followed by another fully connected layer, is shown in FIG. 5b.

In a step 406, for the plurality V of components v and for the plurality of time points t=1, . . . T until the prediction time point T, for each component v, a value of a second moment $\Sigma_t$ of the normal distribution $N(x_t|\mu_t(I), \Sigma_t(I))$ is determined.

The value of the second moment $\Sigma_t$ is determined recursively in the example. This means that the value of the second moment $\Sigma_t$ for the time point t is determined depending on a value of the second moment $\Sigma_{t-1}$ for a time point, e.g., t–1, preceding the time point t.

In one example, the value of the second moment $\Sigma_t$ is determined depending on the covariance $\mathrm{Cov}[f(x_{t-1}, I)]$ of the deterministic change $f(x_{t-1}, I)$ and on the expected value $E[LL^T(x_{t-1}, I)]$ for the stochastic change $L(x_{t-1}, I)$ of the second moment $\Sigma_t$.

It may be provided that the value of the second moment $\Sigma_t$ for the time point t is determined depending on the value of the second moment $\Sigma_{t-1}$ for the preceding time point, e.g., t–1, and the covariance $\mathrm{Cov}[f(x_{t-1}, I)]$ of the deterministic change $f(x_{t-1}, I)$ and the covariance $\mathrm{Cov}[x_{t-1}, f(x_{t-1},I)]$ of the latent state $x_{t-1}$ at the preceding time point $t_{-1}$ with the deterministic change $f(x_{t-1}, I)$ and the transpose of the covariance $\mathrm{Cov}[x_{t-1}, f(x_{t-1}, I)]$ of the latent state $x_{t-1}$ at the preceding time point, e.g., $t_{-1}$, with the deterministic change $f(x_{t-1}, I)$ and the expected value $E[LL^T(x_{t-1}, I)]$ for the stochastic change $L(x_{t-1}, I)$:

$$\sum_t(I) = \sum_{t-1}(I) + \mathrm{Cov}[f(x_{t-1}, I)] +$$
$$\mathrm{Cov}[x_{t-1}, f(x_{t-1}, I)] + \mathrm{Cov}[x_{t-1}, f(x_{t-1}, I)]^T +$$

-continued $$E[LL^T(x_{t-1}, I)]$$

The expected value $E[LL^T(x_{t-1}, I)]$, i.e., the change in the second moment $\Sigma_t$, in one example, is determined depending on edges $\varepsilon$ from the context variable I and the latent state $x_{t-1}$ at the preceding time point. In the example, the tool is used to determine $E[L]$ and $Cov[L]$ and thus $E[LL^T(x_{t-1}, I)]=Cov[L]+E[L]E[L]^T$.

The edges in the example in the matrix $N^m$ are binary values 0 or 1, which, for example, indicate with the value 1 that an edge exists between two nodes and are otherwise zero. The latent state $$x_t^m$$

of an agent m at the time point t is represented by a node in the graph.

Using the operation AGG in the example, the messages $$x_t^{N_m}$$

are determined depending on the matrix $N^m$ and the latent state $x_{t-1}$ at the preceding time point. The messages $x_t^{N_m}$ are concatenated with the state $x_{t-1}$ at the preceding time point and mapped onto the expected value $E[LL^T(x_{t-1}, I)]$.

Figure 5C:
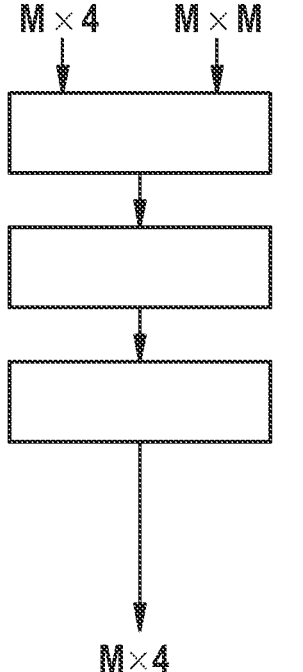

An example of a neural network $L(x_{t-1}, I)$ with a layer for the operation AGG, which is followed by 24 fully connected layers and a ReLu activation, which is followed by a fully connected layer and a ReLu activation, is shown in FIG. 5c.

The inner loop includes steps 404 and 406.

In a step 408, for each component v, an expected value $E[g(x_{T,v})]$ for the first moment $g(x_{T,v})$ of the normal distribution $N(y_t|g(x_t), QQ^T(x_t))$ at the prediction time point T is determined. The distribution of $y_t$, in one example, is approximated by a Gaussian mixture model (GMM) $y_T\sim\Sigma_v\pi(I)N(y_T|a_{T,v}(I), B_{T,v}(I))$.

In the example, for each component v, depending on the value of the first moment $g(x_{T,v})$ at the prediction time point T, a covariance of $Cov[g(x_{T,v})]$ of the first moment $g(x_{T,v})$ is determined.

In a step 410, the expected value $E[g(x_{T,v})]$ for the first moment $g(x_{T,v})$ of the normal distribution $N(y_{t,v}|g(x_{t,v}), QQ^T(x_{t,v}))$ is determined depending on the value of the first moment $\mu_{T,v}$ at the prediction time point T.

In a step 412, a first moment $a_{T,v}(I)$ of the normal distribution $N(a_{T,v}(I), B_{T,v}(I))$ is determined.

In the example, for each component v, depending on a latent state $x_{T,v}$ at the prediction time point T, an expected value $E[QQ^T(x_{T,v})]$ for the second moment $QQ^T(x(t))$ of the normal distribution $N(y_t|g(x_t), QQ^T(x_t))$ at the prediction time point T is determined as described in Anqi Wu as a function of $x_t\sim N(x\_t|\mu_{t,v},\Sigma_{t,v})$ by the tool.

In the example, the expected value $E[g(x_{T,v})]$ defines the first moment $a_{T,v}(I)$, e.g., by $$a_{T,v}(I) = E[g(x_{T,v})]$$

The expected value $E[g(x_{T,v})]$ is determined in the example using the tool.

Figure 5D:
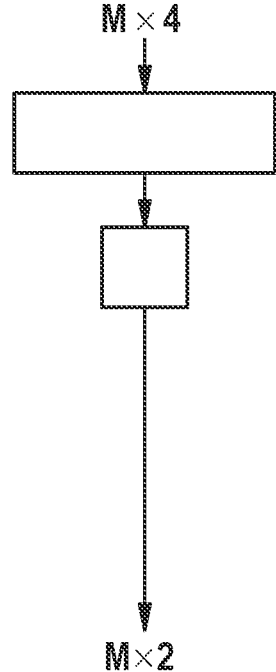

An example of a neural network $g(x_{t,v})$ with 24 fully connected layers and a ReLu activation, which is followed by a fully connected layer, is shown in FIG. 5d. For $Q(x_t)$, a constant is assumed in the example, but more complex neural networks are also possible.

In a step 414, for each component v, a second moment $B_{T,v}(I)$ of the normal distribution $N(a_{T,v}(I), B_{T,v}(I))$ is determined.

In the example, for each component v, depending on the covariance $Cov[g(x_{T,v})]$ of the first moment $g(x_{T,v})$ and on the expected value $E[QQ^T(x_{T,v})]$ for the second moment $QQ^T(x_{T,v})$ at the prediction time point T, the second moment $V_{T,v}(I)$ of the normal distribution $N(a_{T,v}(I), B_{T,v}(I))$ is determined, e.g., by $$B_T, v(I) = Cov[g(x_{T,v})] + E[QQ^T(x_{T,v})]$$

The Covariance $Cov[g(x_{T,v})]$ and the expected value $E[QQ^T(x_{T,v})]$ are determined in the example using the tool.

The outer loop includes steps 408 to 414.

In a step 416, in particular weighted by at least one weight $\pi_v(I)$, a sum $$\sum_{V=1}^V \pi_v(I)N(a_{T,v}(I), B_{T,v}(I))$$

of the third normal distributions $N(a_{T,v}(I), B_{T,v}(I))$ of the components v is determined.

In a step 420, the prediction $p(y_T|I)$ of the behavior $$y_t = \{y_t^m\}_{i=1}^M$$

is determined depending on the sum $$\sum_{v=1}^V \pi_v(I)N(a_{T,v}(I), B_{T,v}(I))$$

e.g., $$p(y_T | I) = \sum_{v=1}^V \pi_v(I)N(a_{T,v}(I), B_{T,v}(I))$$

v=1

In a step 422, the prediction is output and/or at least one agent 102 is controlled depending on the prediction.

For example, the computer-controlled machine, the robot, the vehicle, the household appliance, the driven machine, the manufacturing machine, the personal assistant, or the access control system is controlled.

For example, the prediction for the molecular dynamics is determined and output. For example, the prediction for the movement during the game is determined and output.

The covariances for the different combinations of the latent states can be processed as a matrix of dimension $MD_x\times MD_x$, which comprises blocks which are respectively defined by one of the covariances. In one example, it is provided that the matrix is approximated as a thinly populated matrix.

Figure 6:
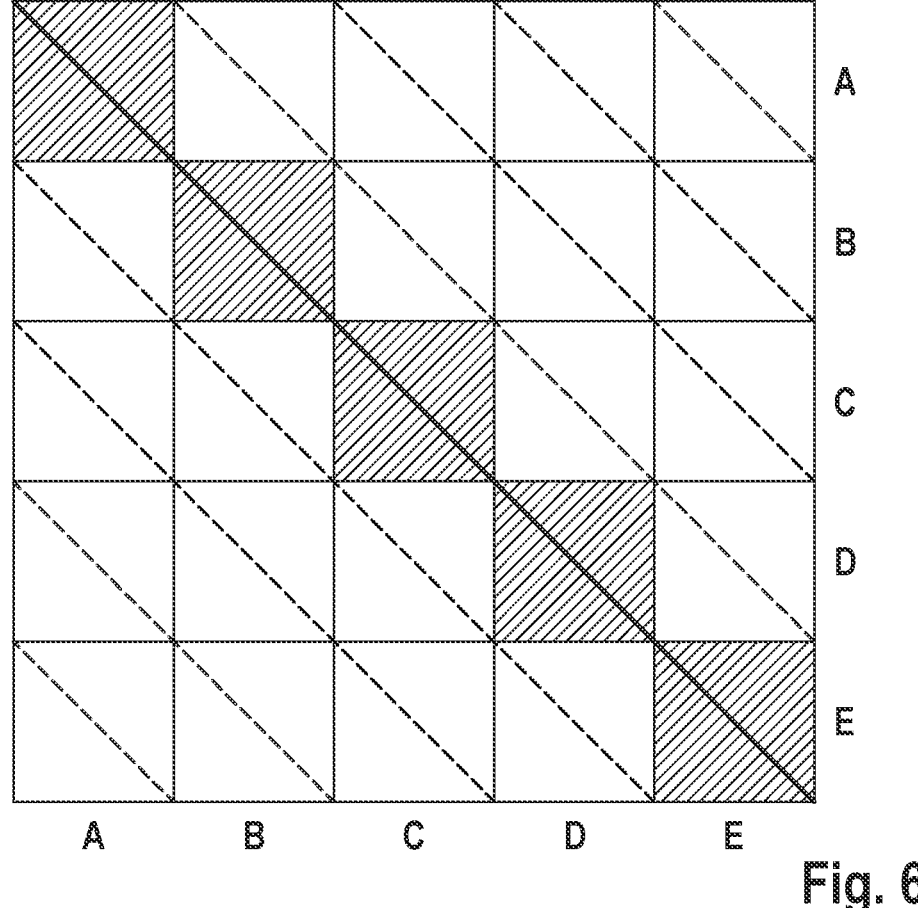
FIG. 6 shows a schematic representation of approximations of a covariance matrix, according to an example embodiment of the present invention.

FIG. 6 shows a schematic representation of approximations of a covariance matrix for five agents A, B, C, D, E.

The latent state of an agent m comprises several elements in one example. For example, for the trajectories, the latent state comprises an element for a velocity of the agent m and an element for an acceleration of the agent m. The elements do not have to be physical quantities but may also relate to other aspects of a state of an agent.

In a first approximation of the matrix, only elements from the matrix located on the major diagonal of the matrix are used for the prediction, wherein other elements of the matrix are not considered. This means that the latent states of an agent m are modeled independently of one another and the latent states of different agents m are also modeled independently of one another. For example, the velocity of the agent m is modeled independently of its acceleration, and both the velocities of the different agents m and their accelerations are modeled independently of one another.

The main diagonal is shown in FIG. 6 as a solid diagonal line. In a second approximation, the latent states of an agent are modeled independently of one another and corresponding elements of the latent states of different agents are modeled dependently on one another. For example, the velocity and the acceleration of the same agent are modeled independently of one another, and the velocities of the different agents are modeled dependently on one another, and the accelerations of the different agents are modeled dependently of one another. This is represented in FIG. 6 by the solid line and diagonal, dashed lines.

In a third approximation, different elements of the latent state of an agent are modeled dependently on one another and the latent states of different agents are modeled independently of one another. This is shown in FIG. 6 by the diagonal of the shaded blocks.

The parameters $\theta=\{\theta_f, \theta_L\}$ and $\psi=\{\psi_g, \psi_Q\}$ of the neural networks parameterized therewith are determined in the example in a training with a data set D={Y,I}, in the example the observed trajectories, by minimizing the expected negative logarithmic probability:

$$\mathrm{argmin}_{\theta,\psi} - \log E[p(y_t \mid I)]$$

What is claimed is:

1. A computer-implemented method for predicting a behavior of agents in a dynamic system with a multiplicity of interacting agents depending on a latent state thereof, the method comprising the following steps:
   determining, for a plurality of components and for a plurality of time points up to a prediction time point, a value of a first moment of a first distribution, which models the latent state of the agents, for each component;
   determining a value of a second moment of the first distribution;
   determining an expected value for a first moment of a second distribution at a prediction time point, for each component depending on the value of the first moment of the first distribution at the prediction time point and depending on the value of the second moment of the first distribution at the prediction time point, wherein the second distribution models the behavior of the agents depending on the latent state thereof, wherein the expected value for the first moment of the second distribution defines a first moment of a third distribution;
   determining a second moment of the third distribution for each component;

determining a sum, weighted with at least one weight, of the third distributions of the component; and
determining the prediction of the behavior depending on the sum.

2. The method according to claim 1, wherein:
the value of the first moment of the first distribution is determined depending on a value of the first moment of the first distribution for a time point preceding the time point and on an expected value for a deterministic change of the first moment of the first distribution, and/or
the value of the second moment of the first distribution for the time point is determined depending on a value of the second moment of the first distribution for a time point preceding the time point and on a covariance of a deterministic change and on an expected value for a stochastic change of the second moment of the first distribution.

3. The method according to claim 2, wherein the value of the second moment of the first distribution for the time point is determined depending on the value of the second moment of the first distribution for the preceding time point and on the covariance of the deterministic change and on a covariance of the latent state at the preceding time point with the deterministic change and on a transpose of the covariance of the latent state at the preceding time point with the deterministic change and on the expected value for the stochastic change.

4. The method according to claim 1, wherein the expected value for the first moment of the second distribution is determined depending on the value of the first moment of the first distribution at the prediction time point.

5. The method according to claim 1, wherein a covariance of the first moment of the second distribution is determined for each component depending on the value of the first moment of the second distribution at the prediction time point, wherein an expected value for the second moment of the second distribution at the prediction time point is determined for each component depending on a latent state at the prediction time point, wherein the second moment of the third distribution is determined for each component depending on the covariance of the first moment of the second distribution and on the expected value for the second moment of the second distribution at the prediction time point.

6. The method according to claim 1,
wherein a context variable is determined, which includes an association which associates at least one agent with another agent to be considered for predicting the behavior of this agent, and/or which characterizes a history of the dynamic system; and
wherein:
   the first moment of the first distribution is determined depending on the context variable, and/or
   the second moment of the first distribution is determined depending on the context variable, and/or
   the expected value for the first moment is determined depending on the context variable, and/or
   the first moment of the third distribution is determined depending on the context variable, and/or
   the second moment of the third distribution is determined depending on the context variable, and/or
   the at least one weight is determined for at least one component depending on the context variable.

7. The method according to claim 6, wherein:

the history is determined depending on an observed behavior of the at least one agent, the behavior which includes the agent's position or movement, and wherein: i) the agent's position or movement is acquired using a receiver for a satellite-based position determination system, or ii) at least one digital image is acquired using a sensor for digital images, and the agent's position or movement is determined depending on at least one digital image, or iii) a signal is acquired using a speaker for receiving audible sound and the agent's position or movement is determined depending on the signal.

8. The method according to claim 6, wherein the context variable includes a matrix, whose rows each represent one of the agents and whose columns each represent one of the agents, and wherein: i) at least one value of an element of the matrix identified by a row and a column is determined and specifies whether or not the agent identified by the row is to be considered for the prediction for the agent identified by the column, or ii) at least one value of an element of the matrix identified by a row and a column is determined and specifies whether or not the agent identified by the column is to be considered for the prediction for the agent identified by the row.

9. The method according to claim 6, wherein the first moment and the second moment of the first distribution is determined in iterations, wherein for a first one of the iterations for each component, a value of the first moment of the first distribution and a value of the second moment of the first distribution are determined, which depends on the context variable.

10. The method according to claim 1, wherein, for the prediction: i) latent states of each agent are modeled independently of one another and latent states of different agents are modeled independently of one another, or ii) latent states of each agent are modeled independently of one another and corresponding elements of latent states of different agents are modeled dependently on one another, or iii) different elements of a latent state of each agent are modeled dependently on one another and latent states of different agents are modeled independently of one another.

11. The method according to claim 1, wherein at least one agent is controlled depending on the prediction, the at least one agent including a computer-controlled machine, or a robot, or a vehicle, or a household appliance, or a driven machine, or a manufacturing machine, or a personal assistant, or an access control system.

12. The method according to claim 1, wherein the at least one agent is an existing real object in the physical world.

13. A device, comprising:

at least one processor; and at least one memory;

wherein the device is configured to predict a behavior of agents in a dynamic system with a multiplicity of interacting agents depending on a latent state thereof, the device configured to:

determine, for a plurality of components and for a plurality of time points up to a prediction time point, a value of a first moment of a first distribution, which models the latent state of the agents, for each component;

determine a value of a second moment of the first distribution;

determine an expected value for a first moment of a second distribution at a prediction time point, for each component depending on the value of the first moment of the first distribution at the prediction time point and depending on the value of the second moment of the first distribution at the prediction time point, wherein the second distribution models the behavior of the agents depending on the latent state thereof, wherein the expected value for the first moment of the second distribution defines a first moment of a third distribution;

determine a second moment of the third distribution for each component;

determine a sum, weighted with at least one weight, of the third distributions of the component; and determine the prediction of the behavior depending on the sum.

14. A system, comprising:

at least one agent including a computer-controlled machine, or a robot, or a vehicle, or a household appliance, or a driven machine, or a manufacturing machine, a personal assistant, or an access control system; and a device including:

at least one processor; and at least one memory;

wherein the device is configured to predict a behavior of agents in a dynamic system with a multiplicity of interacting agents depending on a latent state thereof, the device configured to:

determine, for a plurality of components and for a plurality of time points up to a prediction time point, a value of a first moment of a first distribution, which models the latent state of the agents, for each component;

determine a value of a second moment of the first distribution;

determine an expected value for a first moment of a second distribution at a prediction time point, for each component depending on the value of the first moment of the first distribution at the prediction time point and depending on the value of the second moment of the first distribution at the prediction time point, wherein the second distribution models the behavior of the agents depending on the latent state thereof, wherein the expected value for the first moment of the second distribution defines a first moment of a third distribution;

determine a second moment of the third distribution for each component;

determine a sum, weighted with at least one weight, of the third distributions of the component; and determine the prediction of the behavior depending on the sum;

wherein the device is configured to control the agent depending on the prediction.

15. A non-transitory computer-readable medium on which is stored a computer program including computer-readable instructions for predicting a behavior of agents in a dynamic system with a multiplicity of interacting agents depending on a latent state thereof, the instructions, when executed by a computer, causing the computer to perform the following steps:

determining, for a plurality of components and for a plurality of time points up to a prediction time point, a value of a first moment of a first distribution, which models the latent state of the agents, for each component;

determining a value of a second moment of the first distribution;

determining an expected value for a first moment of a second distribution at a prediction time point, for each component depending on the value of the first moment of the first distribution at the prediction time point and depending on the value of the second moment of the first distribution at the prediction time point, wherein the second distribution models the behavior of the agents depending on the latent state thereof, wherein the expected value for the first moment of the second distribution defines a first moment of a third distribution;

determining a second moment of the third distribution for each component;

determining a sum, weighted with at least one weight, of the third distributions of the component; and determining the prediction of the behavior depending on the sum.

* * * * *